(12) United States Patent
Chen et al.

(10) Patent No.: US 7,596,449 B2
(45) Date of Patent: Sep. 29, 2009

(54) VEHICLE NAVIGATION SYSTEM WITH A DISPLAY CORRECTION AND DISPLAY CORRECTION METHOD THEREOF

(75) Inventors: Kuo-Rong Chen, Panchiao (TW); Chun-Chung Lee, Taipei (TW); Ming-Wen Yang, Sinjhuang (TW)

(73) Assignee: Sin Etke Technology Co., Ltd., Taipei (TW)

( * ) Notice: Subject to any disclaimer, the term of this patent is extended or adjusted under 35 U.S.C. 154(b) by 620 days.

(21) Appl. No.: 11/515,034

(22) Filed: Sep. 5, 2006

(65) Prior Publication Data

US 2008/0010012 A1    Jan. 10, 2008

(30) Foreign Application Priority Data

Jul. 6, 2006    (TW)    ............... 95124630 A (51) Int. Cl.
*G01C 21/30* (2006.01)
*G01C 21/28* (2006.01)

(52) U.S. Cl. ............... 701/208; 701/216; 701/217; 342/357.13; 342/357.14; 340/995.25

(58) Field of Classification Search ............... None
See application file for complete search history.

(56) References Cited

U.S. PATENT DOCUMENTS

| 5,906,653 | A | * | 5/1999 | Ichimura et al. | ............ 701/207 |
| 6,023,653 | A | * | 2/2000 | Ichimura et al. | ............ 701/208 |
| 6,581,005 | B2 | * | 6/2003 | Watanabe et al. | ........... 701/210 |
| 6,931,322 | B2 | * | 8/2005 | Jung et al. | .................. 701/216 |
| 6,937,935 | B2 | * | 8/2005 | Sato | ............................ 701/207 |
| 7,197,392 | B2 | * | 3/2007 | Lee et al. | .................... 701/208 |

* cited by examiner

*Primary Examiner*—Michael J. Zanelli
(74) *Attorney, Agent, or Firm*—Bacon & Thomas, PLLC (57) ABSTRACT

A vehicle navigation system with a display correction and the display correction method thereof, which first extracts a current display location and corresponding road links, next extracts a next vehicle location and selects all road links ranging within 25 meters from the next vehicle location to generate a first set of road links, next generates a second set of road links from the first set of road links based on an angle of driving direction generated by the gyroscope, next computes vertical distances from the next vehicle location to the second set of road links and selects a road link with a shortest vertical distance, and sets a projection point of the next vehicle location on the road link with the shortest vertical distance to become a next corrected location and displays the vehicle sign on the display screen at a next display location corresponding to the next corrected location.

13 Claims, 6 Drawing Sheets

VEHICLE NAVIGATION SYSTEM WITH A DISPLAY CORRECTION AND DISPLAY CORRECTION METHOD THEREOF

BACKGROUND OF THE INVENTION

1. Field of the Invention

The invention relates to a vehicle navigation system and the display method thereof and, more particularly, to a vehicle navigation system capable of displaying a corrected vehicle signing location on a screen, and the display correction method thereof.

2. Description of Related Art

Figure 1:
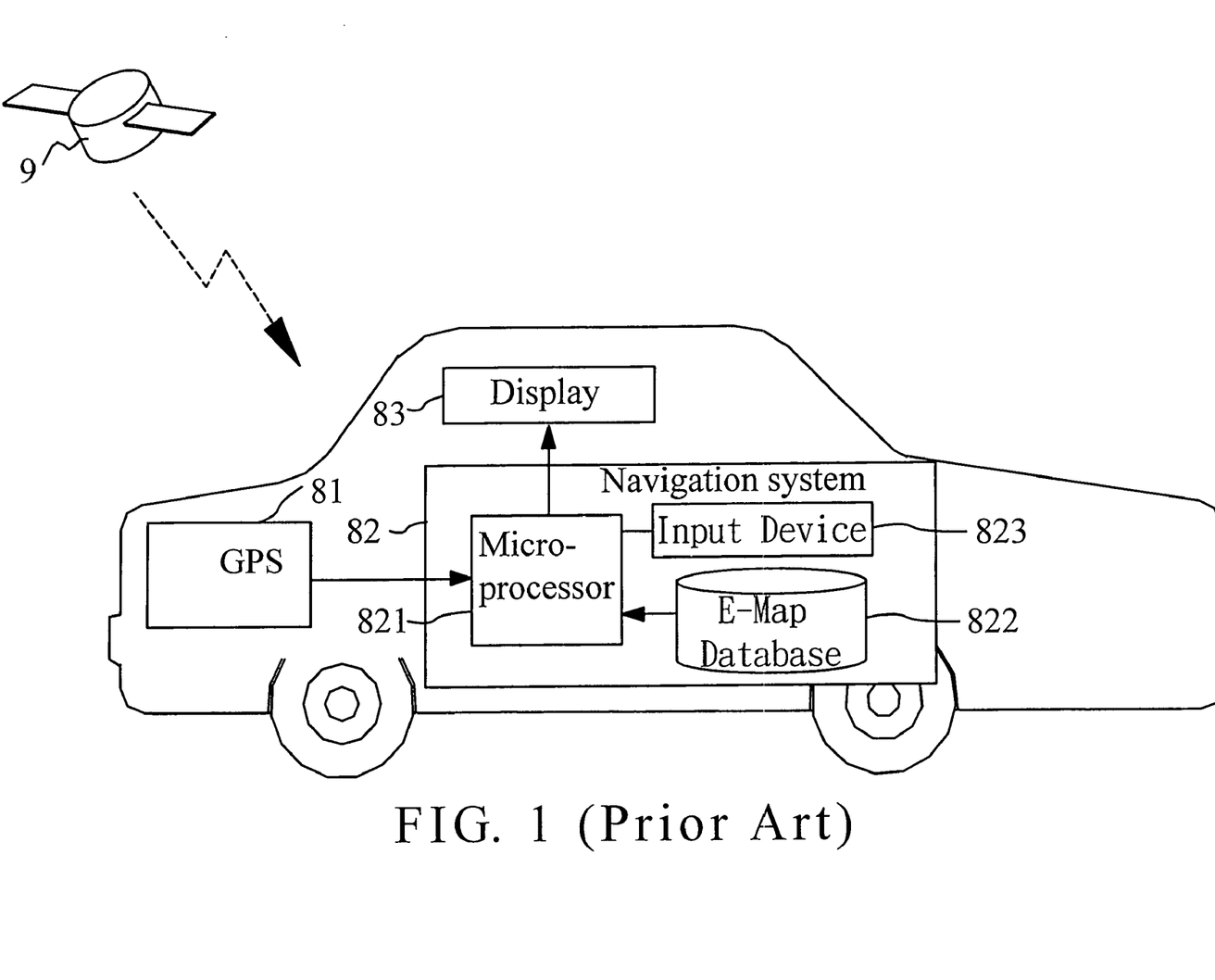
FIG. 1 shows a typical vehicle with a navigation function.

FIG. 1 shows a typical vehicle with a navigation function. As shown in FIG. 1, the vehicle has a global position system (GPS) 81 and a navigation system 82. Typically, the GPS 81 can receive the signals of global positioning satellites in the space and accordingly compute current vehicle coordinates, at any time. The navigation system 82 has a microprocessor 821 to compare the current vehicle coordinates with a built-in e-map database 822 for finding the corresponding location on a map of the database 822 and displaying a sign, which is indicative of the vehicle, on the display 83. Thus, when driving, the driver can know the vehicle's location in real-time.

Figure 2:
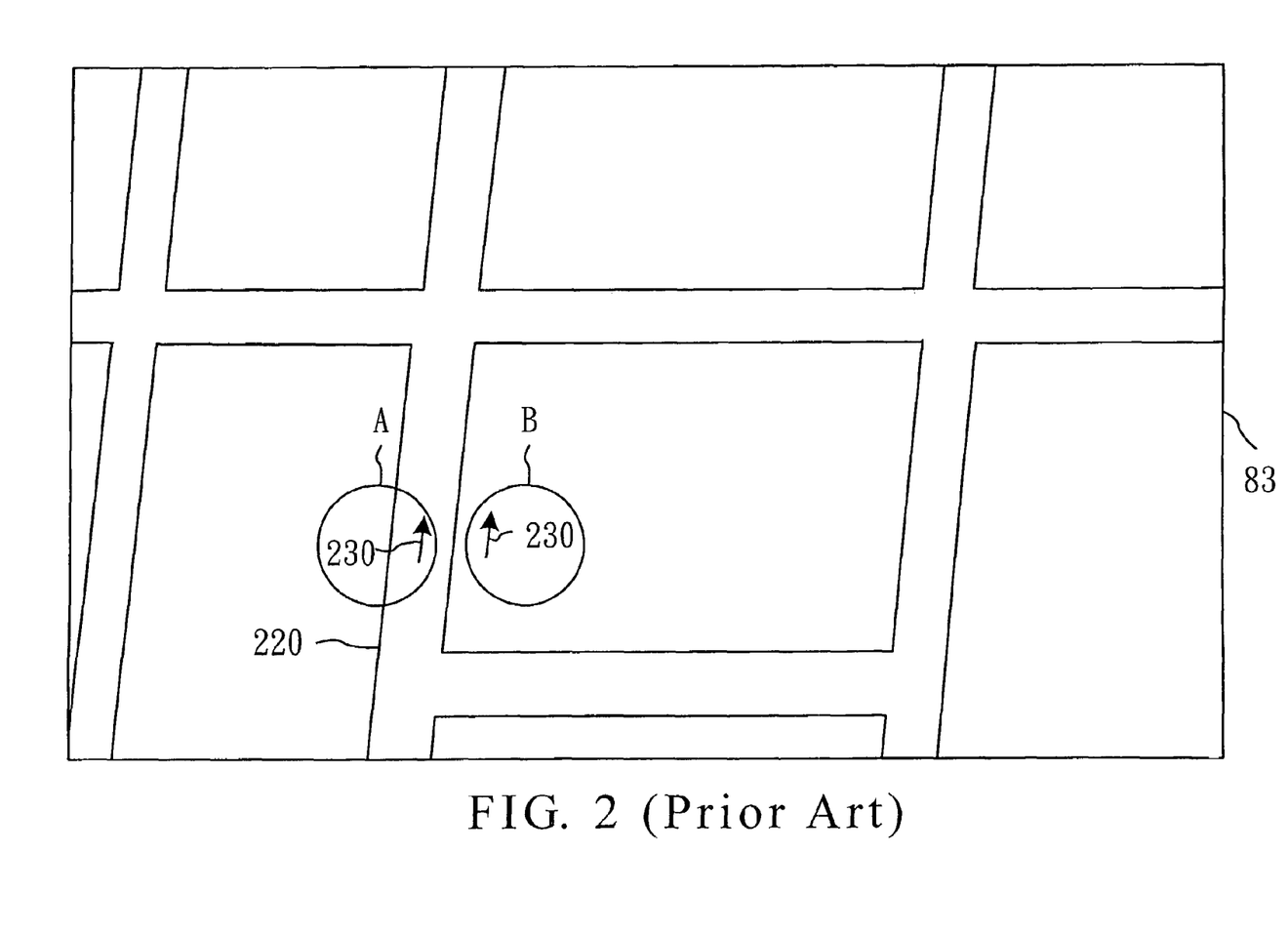
FIG. 2 is a schematic view illustrating an incorrect display of a typical vehicle navigation system.

However, due to a certain inaccuracy, the GPS 81 often generates the condition of FIG. 2 in which a schematic map illustrates an incorrect display of a typical vehicle navigation system. As shown in FIG. 2, when a driver controls a vehicle on the road 220, for a normal condition, a sign 230 indicative of the vehicle is displayed on the road 220, as shown in the circle A. However, due to an error caused by the GPS 81, the microprocessor 821 compares the incorrect current vehicle coordinates with the built-in e-map database 822, and accordingly displays the sign 230, which is indicative of the vehicle, off the road 220, as shown in the circle B. Such an error causes the driver to increasingly doubt the road's condition and to reduce trust in the reliability of the vehicle navigation system. In addition, when the vehicle is driven in a tunnel, the signals of the GPS satellites 9 cannot be received. In this case, the computed value for the current vehicle coordinates is not accurate, and the microprocessor 821 accordingly has an incorrect comparison with the database 822 and displays the sign 230, which is indicative of the vehicle, at an incorrect position. Thus, an improvement on the typical vehicle navigation system is required.

SUMMARY OF THE INVENTION

The invention is to provide a display correction method for a vehicle navigation system. The vehicle navigation system includes a gyroscope, a display screen and an e-map database. The gyroscope generates an angle of driving direction. The e-map database includes plural road links. The display correction method displays a sign, which is indicative of a vehicle, on a display location, and includes the steps: (A) extracting a current display location; (B) reading both a first road link corresponding to the current display location and at least one second road links connected to the first road link from the e-map database; (C) extracting a next vehicle location; (D) selecting road links which have a distance smaller than a first specific distance from the next vehicle location, from the first and second road links to thereby generate a first set of road links; (E) if the first set of road links contains one or more road links, setting the angle of driving direction generated by the gyroscope to become a next angle of driving direction; (F) selecting road links which have an angle difference smaller than a first specific angle from the next angle of driving direction from the first set of road links to thereby generate a second set of road links; (G) if the second set of road links contains the one or more road links, computing vertical distances from the next vehicle location to each of the one or more road links in the second set of road links, selecting a road link with a shortest vertical distance, and setting a projection point of the next vehicle location on the road link with the shortest vertical distance to become a next corrected location; and (H) displaying the sign, which is indicative of the vehicle, on the display screen at a next display location which indicates a position of the display screen corresponding to the next corrected location.

The invention is to provide a vehicle navigation system with a display correction. The vehicle navigation system includes a gyroscope, a global position system (GPS), an e-map database, a display screen and a controller. The gyroscope is implemented on a vehicle in order to determine in which direction the vehicle is being driven, thereby generating an angle of driving direction. The GPS is implemented on the vehicle in order to receive plural satellite signals and accordingly generate data of GPS coordinates, a velocity and a GPS quality indicator that are associated with a current location of the vehicle. The e-map database includes at least one map and plural road links. The display screen displays a sign indicative of the vehicle and the at least one map. The controller is connected to the e-map database, the gyroscope, the GPS, and the display screen in order to display the sign, which is indicative of the vehicle, on the display screen by executing the steps: (A) extracting a current display location; (B) reading both a first road link corresponding to the current display location and at least one second road links connected to the first road link from the e-map database; (C) extracting a next vehicle location; (D) selecting road links which have a distance smaller than a first specific distance from the next vehicle location, from the first and second road links to thereby generate a first set of road links; (E) if the first set of road links contains one or more road links, setting the angle of driving direction generated by the gyroscope to become a next angle of driving direction; (F) selecting road links which have an angle difference smaller than a first specific angle from the next angle of driving direction, from the first set of road links to thereby generate a second set of road links; (G) if the second set of road links contains the one or more road links, computing vertical distances from the next vehicle location to each of the one or more road links in the second set of road links, selecting a road link with a shortest vertical distance, and setting a projection point of the next vehicle location on the road link with the shortest vertical distance to become a next corrected location; and (H) displaying the sign, which is indicative of the vehicle, on the display screen at a next display location which indicates a position of the display screen corresponding to the next corrected location.

Accordingly, the vehicle navigation system with a display correction and the display correction method can accurately display the location of a vehicle, and overcome the incorrect vehicle location display caused by the GPS error.

Other objects, advantages, and novel features of the invention will become more apparent from the following detailed description when taken in conjunction with the accompanying drawings.

DETAILED DESCRIPTION OF THE PREFERRED EMBODIMENT

Figure 3:
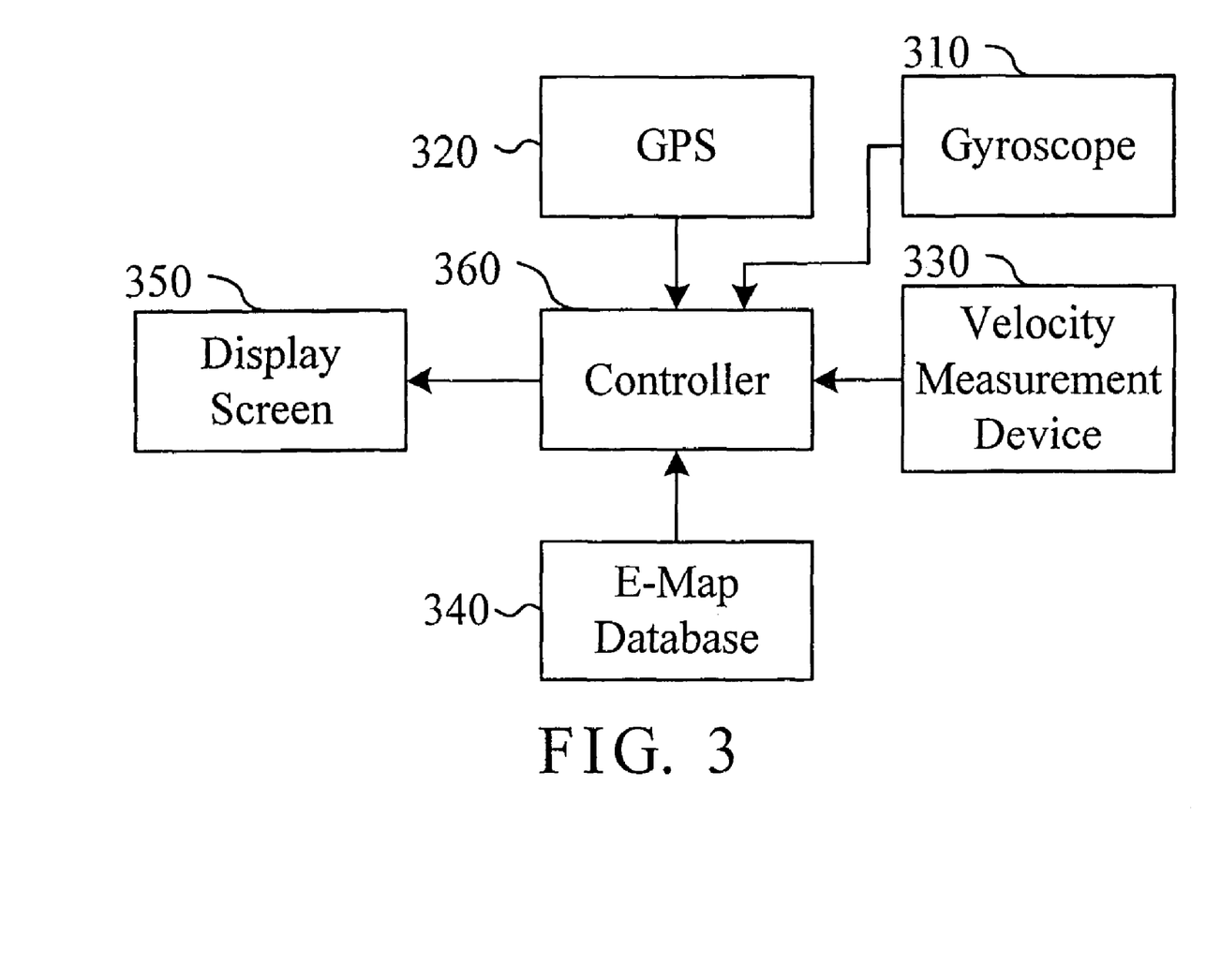
FIG. 3 is a block diagram of a vehicle navigation system in accordance with the invention.

FIG. 3 is a block diagram of a vehicle navigation system in accordance with the invention. As shown in FIG. 3, the system includes a gyroscope 310, a global position system (GPS) 320, a velocity measurement device 330, an e-map database 340, a display screen 350 and a controller 360.

The gyroscope 310 is implemented on a vehicle (not shown) in order to determine in which direction the vehicle is being driven, thereby generating an angle of driving direction. The GPS 320 is implemented on the vehicle in order to receive plural satellite signals and accordingly generate data of GPS coordinates, a velocity data, a head angle and a GPS quality indicator that are associated with a current location of the vehicle. The velocity measurement device 330 is implemented on the vehicle in order to measure the driven speed of the vehicle and accordingly generate a velocity signal.

The e-map database 340 includes the information of at least one map and plural road links. Each of the road links corresponds to a respective road of the map, and records one or more road links in connection. The display screen 350 displays a sign indicative of the vehicle, and the at least one map. The controller 360 is connected to the e-map database 340, the gyroscope 310, the velocity measurement device 330, the GPS 320, and the display screen 350. The controller receives the output data of GPS 320, and accordingly corrects the angle of driving direction generated by the gyroscope 310 and the velocity signal generated by the velocity measurement device 330. The controller 360 also displays the sign, which is indicative of the vehicle, on a display location of the display screen 350.

Figure 4:
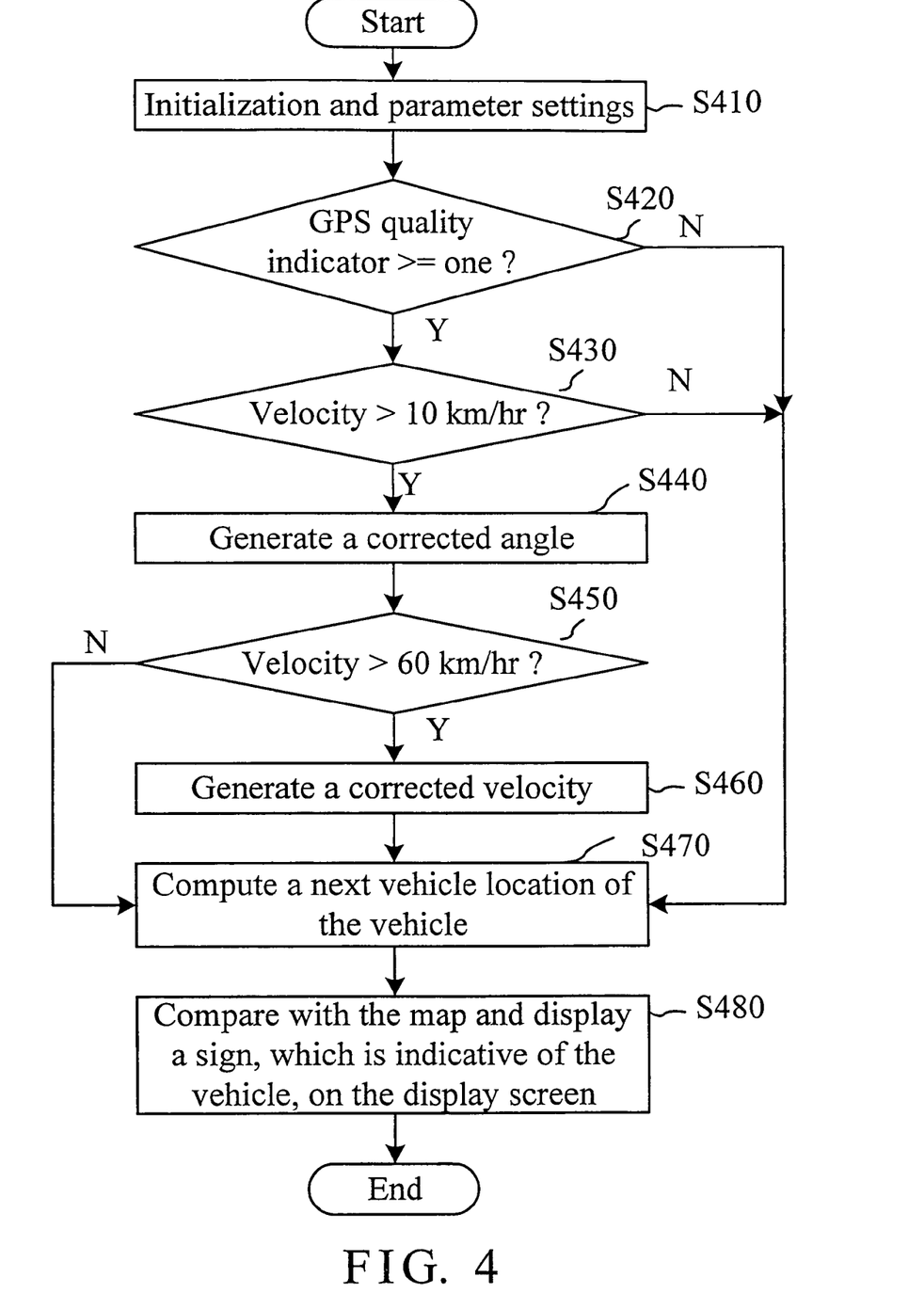
FIG. 4 is a flowchart of a display method for a vehicle navigation system in accordance with the invention.

FIG. 4 is a flowchart of a display method for a vehicle navigation system in accordance with the invention. As shown in FIG. 4, step S410 executes an initialization. Namely, the controller 360 initializes the gyroscope 310, the GPS 320, the velocity measurement device 330 and the display screen 350, and sets the associated operating parameters. In addition, the controller 360 computes a current display location in accordance with the angle of driving direction generated by the gyroscope 310 and the velocity signal generated by velocity measurement device 330.

Step S420 determines if the GPS quality indicator contains a value greater than or equal to one, which indicates that the GPS 320 receives a quality signal.

When step S420 determines that the GPS quality indicator contains a value greater than or equal to one, step S430 further is based on the velocity data generated by the GPS 320 to determine if the velocity of the vehicle exceeds 10 kilometers/hour (a first predetermined velocity). When step S430 determines that the velocity of the vehicle exceeds 10 kilometers/hour, the head angle data generated by the GPS 320 is used to correct the angle of driving direction generated by the gyroscope 310 (S440). For correcting the angle of driving direction, step S440 computes the head angle data of the GPS 320 for correcting the angle of driving direction generated by the gyroscope 310, and accordingly generates a corrected angle.

Step S450 determines if the velocity of the vehicle exceeds 60 kilometers/hour (a second predetermined velocity). When step S450 determines that the velocity of the vehicle exceeds 60 kilometers/hour, the velocity data of the GPS 320 for correcting the velocity signal generated by the velocity measurement device 330 is computed to thereby generate a corrected velocity (S460).

In step S470, when the GPS quality indicator contains a value smaller than one, the controller 360 is based on the velocity signal generated by the velocity measurement device 330 and the angle of driving direction generated by the gyroscope 310 to compute a next vehicle location of the vehicle. When the GPS quality indicator contains a value greater than or equal to one and the velocity of the vehicle exceeds 10 kilometers/hour, the controller 360 is based on the velocity signal generated by the velocity measurement device 330 and the corrected angle to compute the next vehicle location of the vehicle. When the GPS quality indicator contains a value greater than or equal to one and the velocity of the vehicle exceeds 60 kilometers/hour, the controller 360 is based on the corrected velocity and the corrected angle to compute the next vehicle location of the vehicle. Step S480 is the display correction method, which corrects the display of the vehicle by comparing the next vehicle location of the vehicle with the map of the e-map database and results in displaying the sign, which is indicative of the vehicle, on a next display location of the display screen.

Figure 5:
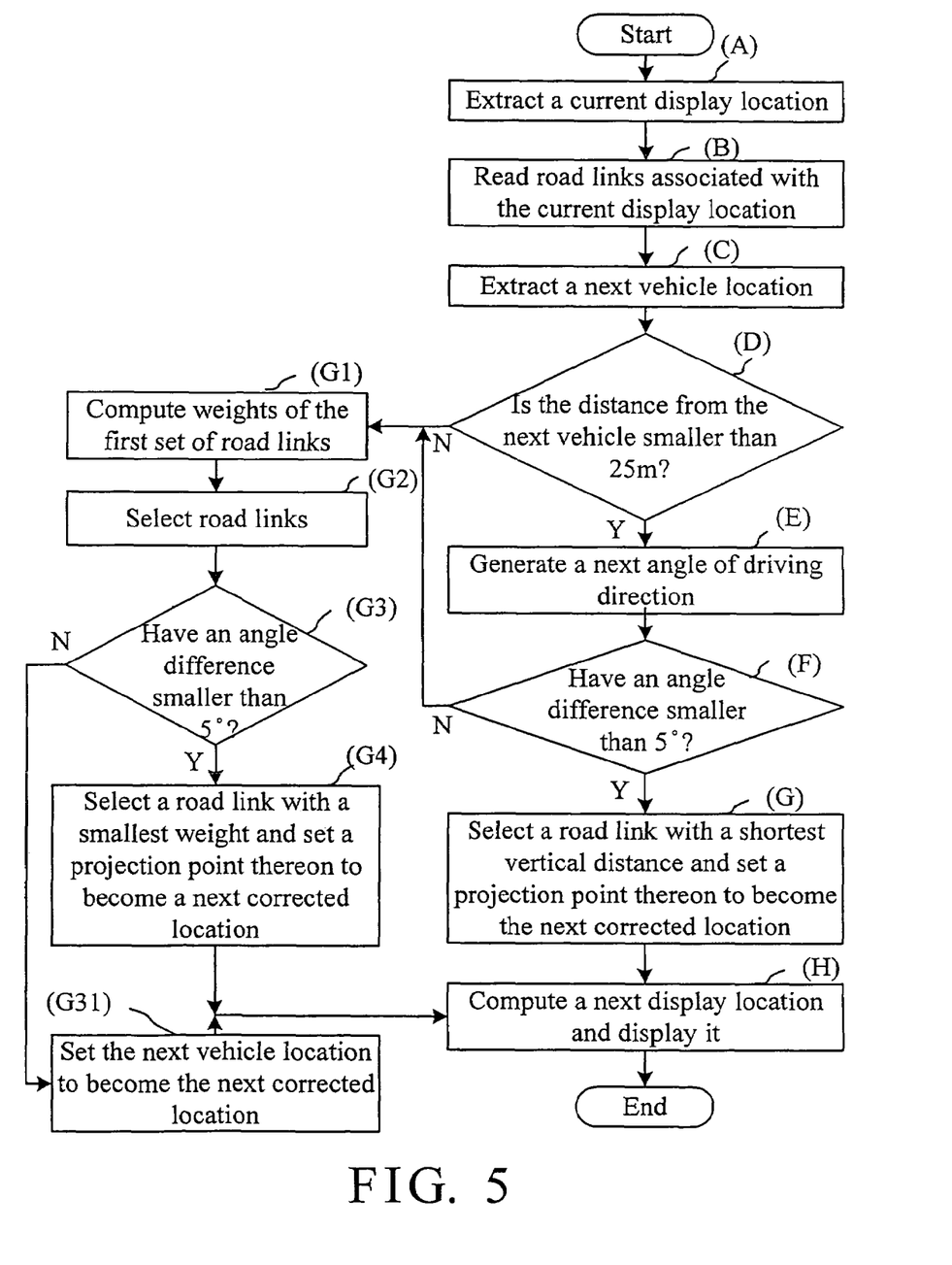
FIG. 5 is a flowchart of a display correction method.
Figure 6:
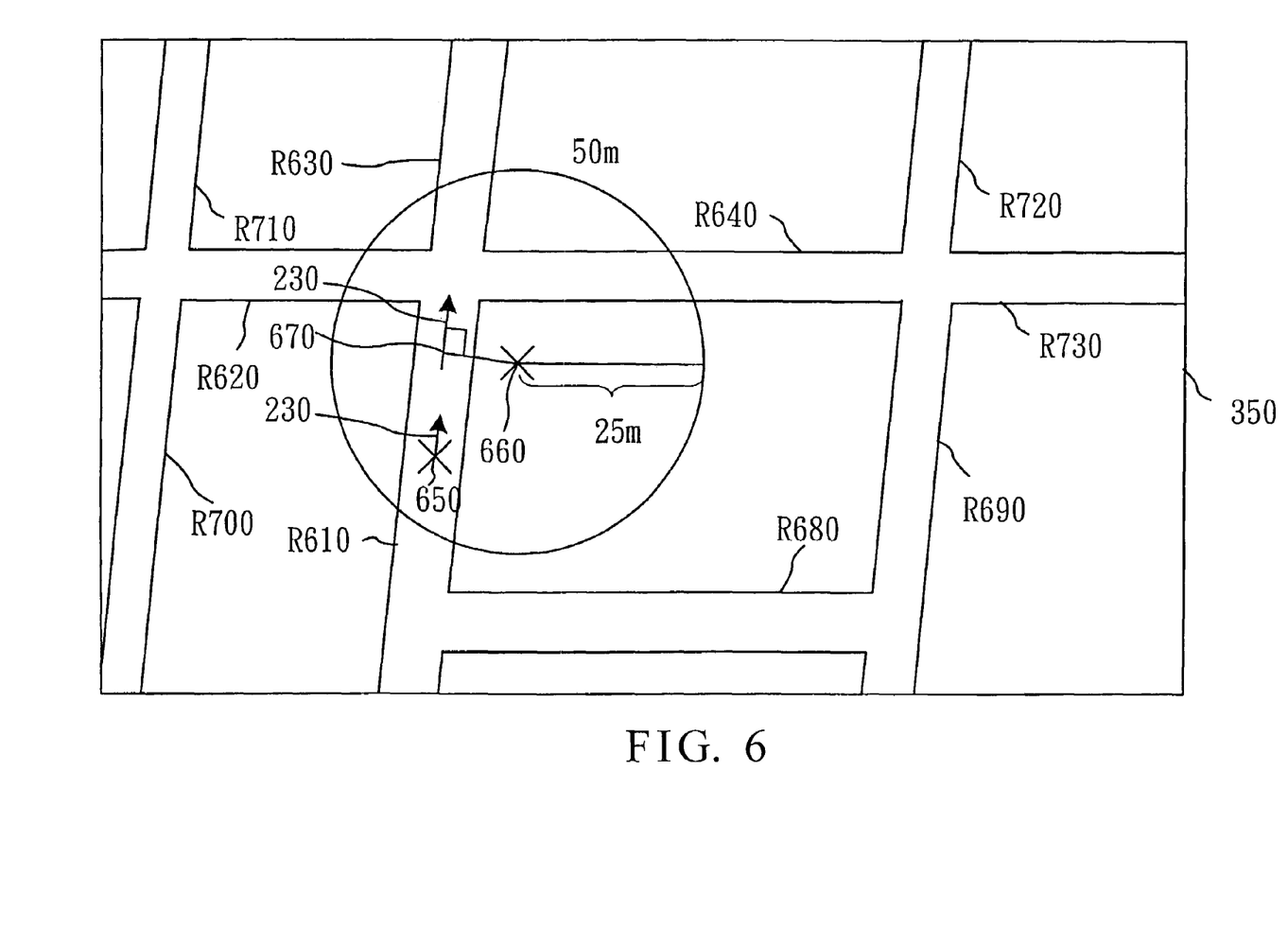
FIG. 6 is a schematic view illustrating an operation of a vehicle navigation system in accordance with the invention.

FIG. 5 is a flowchart of step S480 in accordance with the invention. In step (A), the controller 360 extracts a current display location. The current display location indicates where the sign indicative of the vehicle is located currently on the display screen 350. In step (B), the controller 360 reads both a road link corresponding to the current display location and one or more connected road links to the road link from the e-map database. As shown in FIG. 6, the current display location 650 corresponds to a road link R610. In this case, the controller 360 reads the road link R610 and one or more connected road links R620, R630, R640 and R680.

In step (C), the controller 360 extracts the next vehicle location shown in step S470 of FIG. 4. Namely, when the GPS quality indicator contains a value smaller than one, the controller 360 is based on the velocity signal generated by the velocity measurement device 330 and the angle of driving direction generated by the gyroscope 310 to compute the next vehicle location of the vehicle. When the GPS quality indicator contains a value greater than or equal to one and the velocity of the vehicle exceeds 10 kilometers/hour, the controller 360 is based on the velocity signal generated by the velocity measurement device 330 and the corrected angle to compute the next vehicle location of the vehicle. When the GPS quality indicator contains a value greater than or equal to one and the velocity of the vehicle exceeds 60 kilometers/hour, the controller 360 is based on the corrected velocity and the corrected angle to compute the next vehicle location of the vehicle. In general, the next vehicle location is only a reference to further computation and not displayed on the display screen 350. However, for convenient description, the next vehicle location is indicated by Numeral 660 of FIG. 6.

In step (D), road links which have a distance smaller than 25 meters (a first specific distance) from the next vehicle location, of the road link R610 and the connected road links R620, R630, R640 and R680 are selected, to thereby generate a first set of road links and further determine if the first set of road links contains one or more road links. As shown in FIG. 6, the distances from the next vehicle location 660 to the road links R610, R620, R630 and R640 are all smaller than 25 meters, and accordingly the first set of road links contains the road links R610, R620, R630 and R640. The distance from the next vehicle location 660 to the road link R680 is greater than 25 meters, so that the first set of road links does not contain the load link R680.

In step (E), if step (D) determines that the first set of road links contains the one or more road links, the angle of driving direction generated by the gyroscope 310 is set to become a next angle of driving direction. In other embodiments, an average of the angles of driving direction generated by the gyroscope 310 in a specific period can be set to become the next angle of driving direction. In addition, one, which has the smallest angle difference from the average of the angles of driving direction generated by the gyroscope 310, of the first set of road links R610, R620, R630 and R640 is selected, and its direction is set to become the next angle of driving direction.

In step (F), road links which have an angle difference smaller than a first specific angle from the next angle of driving direction, of the first set of road links are selected to thereby generate a second set of road links and determine if the second set of road links contains one or more road links. In the first set of load links, the road links R610 and R630 have the respective angle differences smaller than 5 degrees from the next angle of driving direction, and the road links R620 and R640 do not have the respective angle differences smaller than 5 degrees from the next angle of driving direction. Accordingly, the second set of road links contains the road links R610 and R630.

In step (G), if step (F) determines that the second set of road links contains the one or more road links, vertical distances from the next vehicle location to each of the one or more road links (R610 and R630) in the second set of road links are first computed, then the road link R610 with the shortest vertical distance is selected, and finally a projection point of the next vehicle location on the road link R610 with the shortest vertical distance is set to become a next corrected location.

In step (H), the sign indicative of the vehicle is displayed on the display screen 350 at a next display location 670 which indicates a position of the display screen 350 corresponding to the next corrected location.

If step (D) determines that the first set of road links does not contain the one or more road links, step (G1) is executed. If step (F) determines that the second set of road links does not contain the one or more road links, step (G1) is executed.

Step (G1) computes a weight W respectively of the road link and the connected road links in step (D). Namely, the weights of the road links R610, R620, R630, R640 and R680 are computed. The weight W is computed by the following equation:

$$W=(0.5\times R/25)+(0.5\times \Delta\theta/180),$$

where W indicates the weight of a road link, R indicates a vertical distance from the next vehicle location 660 to the road link, $\Delta\theta$ indicates an angle difference between the angle of driving direction generated by the gyroscope 310 and the road link.

Step (G2) selects road links which have a distance smaller than 50 meters (a second specific distance) from the next vehicle location 660, from the road links R610, R620, R630, R640 and R680 to thereby generate a third set of road links. The second specific distance is greater than the first specific distance. In this step, it is indicated that there is no road link 25 meters from the next vehicle location 660, or there is a road link 25 meters from the next vehicle location 660 but the angle difference between the next vehicle location 660 and the road link is greater than five degrees. Thus, expansively searching one or more road links is executed by centering the next vehicle location 660.

Step (G3) selects road links which have an angle difference smaller than a second specific angle (five degrees) from the next angle of driving direction, from the third set of road links to thereby generate a fourth set of road links and determine if the fourth set of road links contains one or more road links.

In step (G4), if step (G3) determines that the fourth set of road links contains one or more road links, the one with the smallest weight is selected from the fourth set of road links, and a projection point of the next vehicle location on the road link with the smallest weight is set to become a next corrected location. Next, step (H) is executed.

In step (G31), if it is determined that the fourth set of road links does not contain any road link, it indicates that the vehicle is being driven on a road (maybe a new road) not stored in the e-map database 340. In this case, the controller 360 sets the next vehicle location to become the next corrected location, and executes step (H).

In view of the foregoing, it is known that the invention can overcome the problem of displaying the sign 230 out of the road 220 due to the error caused by the GPS 320. The sign 230 is indicative of the vehicle. In addition, when the data of the GPS quality indicator of the GPS 320 is greater than or equal to one, the outputs of the gyroscope 310 and the velocity measurement device 330 are corrected to thereby avoid the error generated by the gyroscope 310 due to the earth's rotation and thus accurately display the location of a vehicle. When the data of the GPS quality indicator of the GPS 320 is smaller than one, a next vehicle location of the vehicle is computed in accordance with the velocity signal generated by the velocity measurement device 330 and the angle of driving direction generated by the gyroscope 310, to thereby avoid the error caused by the GPS 320 or the problem of displaying the sign 230 at an incorrect location because the signal quality is poor. Thus, the location of the vehicle can be displayed accurately.

Although the present invention has been explained in relation to its preferred embodiment, it is to be understood that many other possible modifications and variations can be made without departing from the spirit and scope of the invention as hereinafter claimed.

What is claimed is:

1. A display correction method for a vehicle navigation system, the vehicle navigation system including a gyroscope, a display screen and an e-map database, the gyroscope generating an angle of driving direction, the e-map database including plural road links, the display correction method displaying a sign, which is indicative of a vehicle, on a display location of the display screen, the display correction method comprising the steps of:

(A) extracting a current display location;

(B) reading both a first road link corresponding to the current display location and at least one second road link connected to the first road link from the e-map database;

(C) extracting a next vehicle location;

(D) selecting road links which have a distance smaller than a first specific distance from the next vehicle location, from the first and second road links to thereby generate a first set of road links;

(E) if the first set of road links contains one or more road links, setting the angle of driving direction generated by the gyroscope to become a next angle of driving direction;

(F) selecting road links which have an angle difference smaller than a first specific angle from the next angle of driving direction, from the first set of road links to thereby generate a second set of road links;

(G) if the second set of road links contains one or more road links, computing vertical distances from the next vehicle location to each of the one or more road links in the second set of road links, selecting a road link with a shortest vertical distance, and setting a projection point of the next vehicle location on the road link with the shortest vertical distance to become a next corrected location; and (H) displaying the sign, which is indicative of the vehicle, on the display screen at a next display location which indicates a position of the display screen corresponding to the next corrected location.

2. The method as claimed in claim 1, further comprising the steps:

(G1) if step (F) determines that the second set of road links does not contain one or more road links, computing a weight W respectively for the first and second road links in step (B), where the weight W is a function $W=f(R, \Delta\theta)$, for R indicates a vertical distance from the next vehicle location to a road link and $\Delta\theta$ indicates an angle difference between the angle of driving direction and the road link;

(G2) selecting road links which have a distance smaller than a second specific distance from the next vehicle location, from the first and second road links to thereby generate a third set of road links, the second specific distance being greater than the first specific distance;

(G3) selecting road links which have an angle difference smaller than a second specific angle from the next angle of driving direction, from the third set of road links to thereby generate a fourth set of road links, and determining if the fourth set of road links contains one or more road links; and (G4) if step (G3) determines that the fourth set of road links contains one or more road links, selecting one with a smallest weight, setting a projection point of the next vehicle location on the road link with the smallest weight to become the next corrected location, and executing step (H).

3. The method as claimed in claim 2, further comprising the step: (G31) if step (G3) determines that the fourth set of road links does not contain any road link, setting the next vehicle location to become the next corrected location, and executing step (H).

4. The method as claimed in claim 2, wherein steps (G1) to (G4) are executed if step (D) determines that the first set of road links does not contain any road link.

5. The method as claimed in claim 2, wherein the weight W is computed by an equation:

$$W=(0.5\times R/25)+(0.5\times \Delta\theta/180).$$

6. The method as claimed in claim 1, wherein the vehicle navigation system further comprises a global position system (GPS), which is implemented on the vehicle in order to receive plural satellite signals and accordingly generate data of GPS coordinates, a velocity and a GPS quality indicator; and a velocity measurement device, which is implemented on the vehicle in order to measure a driven speed of the vehicle and accordingly generate a velocity signal; wherein when the GPS quality indicator contains a value smaller than a first specific value, the next vehicle location in step (C) is computed based on the velocity signal generated by the velocity measurement device and the angle of driving direction generated by the gyroscope.

7. The method as claimed in claim 6, wherein the GPS further generates data of a head angle such that when the GPS quality indicator contains the value greater than or equal to the first specific value and the velocity exceeds a first specific velocity, the data of the head angle of the GPS for correcting the angle of driving direction generated by the gyroscope is computed to thereby generate a corrected angle, and the next angle of driving direction in step (E) is set by adding the corrected angle to the angle of driving direction generated by the gyroscope.

8. The method as claimed in claim 7, wherein when the GPS quality indicator contains the value greater than or equal to the first specific value and the velocity exceeds a second specific velocity, the data of the velocity of the GPS for correcting the velocity signal generated by the velocity measurement device is computed to thereby generate a corrected velocity, and the second specific velocity is greater than the first specific velocity.

9. A vehicle navigation system with a display correction, comprising:

a gyroscope, which is implemented on a vehicle in order to determine in which direction the vehicle is being driven, thereby generating an angle of driving direction;

a global positioning system (GPS), which is implemented on the vehicle in order to receive plural satellite signals and accordingly generate data of GPS coordinates, a velocity, a head angle and a GPS quality indicator that are associated with a current location of the vehicle;

an e-map database, which has at least one map and plural road links;

a display screen, which displays a sign indicative of the vehicle and the at least one map; and a controller, which is connected to the e-map database, the gyroscope, the GPS and the display screen in order to display the sign, which is indicative of the vehicle, on the display screen by executing the steps of: (A) extracting a current display location; (B) reading both a first road link corresponding to the current display location and at least one second road link connected to the first road link from the e-map database; (C) extracting a next vehicle location; (D) selecting road links which have a distance smaller than a first specific distance from the next vehicle location, from the first and second road links to thereby generate a first set of road links; (E) if the first set of road links contains one or more road links, setting the angle of driving direction generated by the gyroscope to become a next angle of driving direction; (F) selecting road links which have an angle difference smaller than a first specific angle from the next angle of driving direction, from the first set of road links to thereby generate a second set of road links; (G) if the second set of road links contains one or more road links, computing vertical distances from the next vehicle location to each of the one or more road links in the second set of road links, selecting a road link with a shortest vertical distance, and setting a projection point of the next vehicle location on the road link with the shortest vertical distance to become a next corrected location; and (H) displaying the sign, which is indicative of the vehicle, on the display screen at a next display location which indicates a position of the display screen corresponding to the next corrected location.

10. The system as claimed in claim 9, further comprising:

a velocity measurement device, which is implemented on the vehicle in order to measure a driving speed of the vehicle and accordingly generate a velocity signal.

11. The system as claimed in claim 10, wherein when the GPS quality indicator contains a value smaller than a first specific value, the next vehicle location in step (C) is computed in accordance with the velocity signal generated by the velocity measurement device and the angle of driving direction generated by the gyroscope.

12. The system as claimed in claim 11, wherein when the GPS quality indicator contains the value greater than or equal to the first specific value and the velocity exceeds a first specific velocity, the data of the head angle of the GPS for correcting the angle of driving direction generated by the gyroscope is computed to thereby generate a corrected angle, and the next angle of driving direction in step (E) is set by adding the corrected angle to the angle of driving direction generated by the gyroscope.

13. The system as claimed in claim 12, wherein when the GPS quality indicator contains the value greater than or equal to the first specific value and the velocity exceeds a second specific velocity, the data of the velocity of the GPS for correcting the velocity signal generated by the velocity measurement device is computed to thereby generate a corrected velocity, and the second specific velocity is greater than the first specific velocity.

\* \* \* \* \*

UNITED STATES PATENT AND TRADEMARK OFFICE
CERTIFICATE OF CORRECTION

PATENT NO.        : 7,596,449 B2                                Page 1 of 1
APPLICATION NO. : 11/515034
DATED             : September 29, 2009
INVENTOR(S)       : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 644 days.

Signed and Sealed this

Twenty-eighth Day of September, 2010

David J. Kappos
*Director of the United States Patent and Trademark Office*